United States Patent Office 2,710,597
Patented June 14, 1955

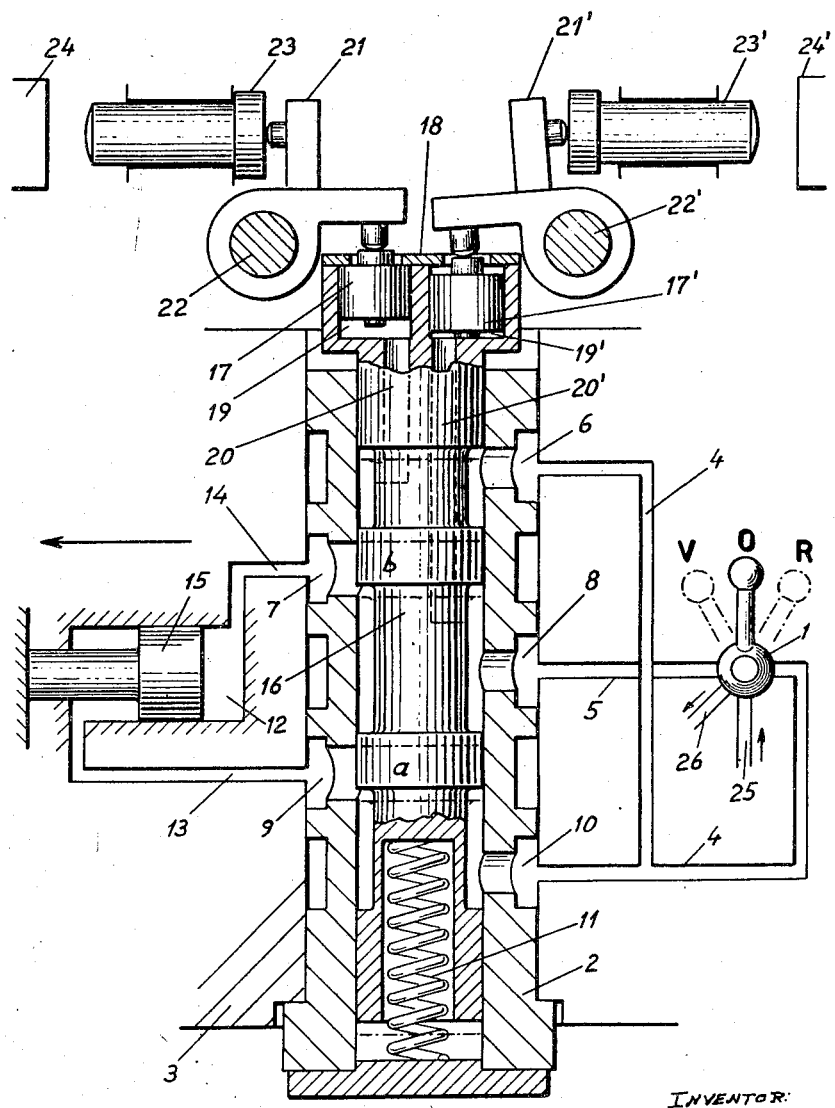

2,710,597

HYDRAULIC VALVE DEVICE LIMITING THE MOVEMENTS OF A MACHINE COMPONENT

Rudolf Ineichen, Zurich, Switzerland, assignor to Machine Tool Works Oerlikon, Administration Company, Zurich-Oerlikon, Switzerland, a company of Switzerland Application September 24, 1953, Serial No. 382,147

Claims priority, application Switzerland October 2, 1952

3 Claims. (Cl. 121—45)

The invention relates to a hydraulic valve device limiting the movements of a machine component, for example of a bed- or tool-carriage of a machine tool, which is driven to-and-fro by hydraulic servo-motor means supplied with hydraulic pressure in alternate directions through switch-over means from a source of hydraulic pressure. Any such hydraulically generated movement of a machine component can be accurately limited by hydraulic valves controlled by feeler means abutting on stationary stops. However, the embodiments hitherto known of such valves acted in one direction only of the movement of the machine component, and had to be put out of action by hand for the purpose of moving the machine component away from the said fixed stops.

The present invention has the primary object of providing a hydraulic valve of the kind referred to and adapted to be fitted into a hydraulically moved machine component which valve acts in both directions of movement and permits an automatic moving away of the machine component from the stationary stops as soon as switch-over means determining the direction of movement of the machine component are operated in the usual way.

With this and other objects in view I provide a hydraulic valve device of the kind referred to, comprising in combination: a ported bushing fixedly mounted on the said machine component and interposed into the hydraulic connection between the said source of hydraulic pressure and the said servo-motor means, a piston valve arranged slidably in the said ported bushing and having a locking position in which it blocks the connection from the said bushing to the said servomotor means and thereby arrests the said machine component, and a working position in which it establishes connection between the said source of hydraulic pressure and the said servo-motor means and thereby allows the latter to move the said machine component in the direction adjusted by the said switch-over means, biasing means loading the said piston valve in the direction towards the said working position, and feeler means mounted on the said machine component in an operative relation to the said piston valve and to external fixed stop means, the said feeler means when abutting on the said stop means overriding the said biasing means and forcing the said piston valve into its locking position.

These and other objects and features of my said invention will be clearly understood from the following detailed description of a preferred embodiment thereof given by way of example with reference to the accompanying drawing which is a longitudinal section of a hydraulic valve according to the invention with the associated components represented merely diagrammatically.

A switch-over valve means 1, having three control positions: forward (V), neutral (0) and reverse (R) is connected by two oil pipes 4, 5 with the ported bushing 2 which is mounted in the machine component 3. The oil pipe 5 issues into a middle chamber 8 of the ported bushing 2, while the pipe 4 branches out and issues into the two outermost chambers 6, 10. The two intermediate chambers 7, 9 of the ported bushing 2 are connected by oil pipes 13, 14 with two sides of a hydraulic servo-motor cylinder 12 which is fixedly mounted on the machine component 3. The piston 15 of the said hydraulic servo-motor cylinder 12 is rigidly coupled to a stationary part of the machine.

The ported bushing 2 contains a piston valve 16 which is slidably moveable in, and accurately fitted into, its bore and which has two control lands $a$ and $b$. In the locking position (drawn in chain-dotted lines) the said lands completely block the discharge ports of the chambers 9 and 7 leading to the pipes 13 and 14, respectively. In the working position as illustrated in full lines, however, the piston valve 16 establishes communication between the pipes 5 and 14 on the one hand, and the pipes 4 and 13 on the other hand. Resilient spring means 11 bias the piston valve 16 constantly upwards from the locking position towards the working position.

In the upper portion of the piston valve 16 two little pistons 17, 17' are fitted into bores, moveable a limited distance in their axial direction. A cover plate 18 limits the stroke of the small pistons 17, 17'. The cylinder space 19 below the small piston 17 is in communication with the outer chamber 6 through a duct 20 in the interior of the piston valve 16, and accordingly also with the oil pipe 4, while the space 19' below the small piston 17' is in communication through a similar duct 20' with the middle chamber 8 and accordingly with the oil pipe 5. The upper faces of the small pistons 17, 17' are acted upon by rocker levers 21, 21', respectively, which are pivotally mounted on axles 22, 22', respectively, fixed to the machine component 3, and which transmit the movement of slidably mounted feeler means 23, 23', respectively, to the piston valve 16 when the said feeler means abut on fixed stops 24, 24', respectively.

The manner of operation of this hydraulic valve device is as follows:

Assuming the switch-over valve means 1 to be in the position V. Then the pressure oil supplied to it by an external source of hydraulic pressure (not shown) through a pipe 25 is passed to the pipe 4, while the pipe 5 is connected to the oil return pipe 26 leading to the input side or sump of the said source of hydraulic pressure. The pressure oil passes through the pipe 4 into the two outer chambers 6 and 10 of the ported bushing 2. From the chamber 10 it flows to the pipe 13, and eventually arrives at the left hand side of the hydraulic servo-motor cylinder 12 which is moveable together with the machine component 3. The latter accordingly moves in the direction of the arrow towards the stop 24.

At the same time pressure oil from the chamber 6 flows through the duct 20 into the cylinder space 19 whereby the small piston 17 is forced right up against the cover plate 18. Upon movement of the servo-motor cylinder 12 in the direction of the arrow the oil enclosed on the right hand side of this cylinder is expelled. It flows through the pipe 14 to the piston valve 16 and from there through the pipe 5 to the switch-over valve means 1, from where it flows through the return pipe 26 to the oil sump (not shown) of the external source of hydraulic pressure.

When the feeler means 23 abuts on the stop 24, it rocks the rocker lever 21 and thereby pushes the small piston 17 downwards. Through the cushion of pressure oil contained in the cylinder space 19 the piston valve 16 is accordingly pushed downward against the biasing force of the spring 11. The machine component 3 comes to a standstill immediately the piston valve has arrived in its locking position, i. e. when the lands $a$ and $b$ thereof completely block the communication between the oil pipes 4 and 13 on the one hand, and 5 and 14 on the other hand.

When now the machine component 3 is to be moved in the opposite direction, merely the switch over valve 1 is to be turned into the position R. This has the consequence of effecting a change of pressure in the oil pipes 4 and 5: the pipe 5 then carries pressure oil, while the pipe 4 is connected to the oil return pipe 26, and therefore also the duct 20 and the cylinder space 19 are put in communication with the oil return pipe. The piston valve 16 is accordingly forced by the resilient force of the spring 11 upwards from the locking position the height of the cylinder space 19, the oil volume contained in the cylinder space 19 being passed through the duct 20, chamber 6 and oil pipe 4 into the oil return pipe 26.

In the new position of the piston valve pressure oil can flow from the pipe 5 through the middle chamber 8, the port 7 and the pipe 14 to the right hand side of the servo-motor cylinder 12, so that the latter, and together with it the machine component 3, is moved in the direction opposite to that of the arrow.

At the same time pressure oil from the chamber 8 flows through the duct 20' into the cylinder space 19', and forces the small piston 17' upwards into a position of readiness, in which it rigidly transmits the movement of the feeler means 25' to the piston valve 16, when the said feeler means abuts on the stop 24'. When the direction of movement of the machine component 3 is changed and the same is to be moved away from the stop 24', a process exactly analogous to that described herein with respect to stop 24 is carried out.

While I have described hereinabove, and illustrated in the accompanying drawing, what may be considered a typical and particularly useful embodiment of my said invention, I wish it to be understood that I do not limit myself to the particular details and dimensions described and illustrated, for obvious modifications will occur to a person skilled in the art. For example the machine component need not abut against stops in both directions of movement. The invention can be applied also to machine components the movement of which is to be accurately limited by a stop in one direction only. In this case one feeler means 23, one rocker lever 21, and one small piston 17 only are to be provided on the piston valve 16.

What I claim as my invention and desire to secure by Letters Patent, is:

1. A hydraulic valve device limiting the movement of a machine component which is driven to-and-fro by hydraulic servo-motor means supplied with hydraulic pressure in alternate directions through switch-over valve means from a source of hydraulic pressure, comprising in combination: a ported bushing fixedly mounted on said machine component and interposed into the hydraulic connection between said source of hydraulic pressure and said servo-motor means, a piston valve arranged slidably in said ported bushing and having a locking position in which it blocks the connection from said bushing to said servo-motor means and thereby arrests said machine component, and a working position in which it establishes connection between said source of hydraulic pressure and said servo-motor means and thereby allows the latter to move said machine component in the direction adjusted by said switch-over valve means, biasing means loading said piston valve in the direction towards said working position, feeler means mounted on said machine component in an operative relation to said piston valve and to external fixed stop means, said feeler means when abutting on said stop means overriding said biasing means and forcing said piston valve into its locking position, hydraulically operated coupling means mounted on said piston valve alternately rigidly coupling the same to, and uncoupling the same from, said feeler means, said coupling means being in hydraulic connection through said switch-over valve means to said source of hydraulic pressure and by the application of hydraulic pressure therefrom being engaged during the movement of said machine component towards and including the abutting thereof on said stop means, and being disengaged by temporary release of hydraulic pressure upon reversal of said switch-over valve means, whereby said piston valve is released to return to its working position under the action of said biasing means.

2. A hydraulic valve device limiting the movement of a machine component which is driven to-and-fro by hydraulic servo-motor means supplied with hydraulic pressure in alternate directions through switch-over valve means from a source of hydraulic pressure, comprising in combination: a ported bushing fixedly mounted on said machine component and interposed into the hydraulic connection between said source of hydraulic pressure and said servo-motor means, a piston valve arranged slidably in said ported bushing and having a locking position in which it blocks the connection from said bushing to said servo-motor means and thereby arrests said machine component, and a working position in which it establishes connection between said source of hydraulic pressure and said servo-motor means and thereby allows the latter to move said machine component in the direction adjusted by said switch-over valve means, biasing means loading said piston valve in the direction towards said working position, feeler means mounted on said machine component in an operative relation to said piston valve and to external fixed stop means, said feeler means when abutting on said stop means overriding said biasing means and forcing said piston valve into its locking position, hydraulically operated coupling means mounted on said piston valve alternately rigidly coupling the same to, and uncoupling the same from, said feeler means, said coupling means being in hydraulic connection through said switch-over valve means to said source of hydraulic pressure and by the application of hydraulic pressure therefrom being engaged during the movement of said machine component towards and including the abutting thereof on said stop means, and being disengaged by temporary release of hydraulic pressure upon reversal of said switch-over valve means, whereby said piston valve is released to return to its working position under the action of said biasing means, said hydraulically operated coupling means comprising a small piston slidably moveable within limits in a bore of said piston valve connected through said switch-over valve means to said source of hydraulic pressure, said small piston positively cooperating with said feeler means and, when supplied with hydraulic pressure, transmitting the force from said feeler means abutting on said fixed stop means to said piston valve in the sense of moving the same into its locking position.

3. A hydraulic valve device limiting the movements of a machine component which is driven to-and-fro by hydraulic servo-motor means supplied with hydraulic pressure in alternate directions through switch-over valve means from a source of hydraulic pressure, comprising in combination: a ported bushing fixedly mounted on the said machine component and interposed in the hydraulic connection between the said source of hydraulic pressure and the said servo-motor means, a piston valve slidably arranged in the said bushing and having two lands dividing the interior of the said bushing into an inner and two outer chambers, the said chambers being alternately connected by the said switch-over valve means to the output and to the input side of the said source of hydraulic pressure, the said piston valve having a locking position in which it blocks the connection from the said bushing to the said servomotor means and thereby arrests the said machine component, and a working position in which it establishes connection between the said source of hydraulic pressure and the said servo-motor means and thereby allows the latter to move the said machine component in the direction adjusted by the said switch-over valve means, biasing means loading the said piston valve towards the said working position, two feeler means mounted on the said machine component each cooperating with an external fixed stop means according to the direction of movement of the said machine component, two small pistons slidable independently of one another in bores of the said piston valve and each positively cooperating with one of the said feeler means, the said bores being in communication through ducts in the said piston valve with the said inner and outer chambers, respectively, and when exposed to hydraulic pressure transmitting the force from its associated feeler means abutting on its respective fixed stop means to the said piston valve in the sense of moving the same into its locking position, and when released from hydraulic pressure allowing the said piston valve to be returned to its working position by the said biasing means.

References Cited in the file of this patent

UNITED STATES PATENTS

| | | |
|---|---|---|
| 1,938,762 | Haas | Dec. 12, 1933 |
| 2,064,051 | Allard | Dec. 15, 1936 |
| 2,458,290 | Monroe | Jan. 4, 1949 |

FOREIGN PATENTS

| | | |
|---|---|---|
| 571,979 | Germany | Mar. 16, 1933 |